United States Patent
Duan et al.

(10) Patent No.: US 10,779,555 B2
(45) Date of Patent: Sep. 22, 2020

(54) METHOD FOR EFFICIENTLY AND MILDLY REDUCING OVALBUMIN ALLERGENICITY

(71) Applicant: NORTHWEST A&F UNIVERSITY, Xianyang (CN)

(72) Inventors: Xiang Duan, Xianyang (CN); Xuebo Liu, Xianyang (CN); Yinying Tan, Xianyang (CN); Ying Lan, Xianyang (CN); Yutang Wang, Xianyang (CN); Zhigang Liu, Xianyang (CN); Chunxia Xiao, Xianyang (CN); Lin Chen, Xianyang (CN)

(73) Assignee: NORTHWEST A&F UNIVERSITY, Xianyang (CN)

( * ) Notice: Subject to any disclaimer, the term of this patent is extended or adjusted under 35 U.S.C. 154(b) by 99 days.

(21) Appl. No.: 16/081,925

(22) PCT Filed: Jan. 24, 2018

(86) PCT No.: PCT/CN2018/073968
§ 371 (c)(1),
(2) Date: Sep. 3, 2018

(87) PCT Pub. No.: WO2018/201759
PCT Pub. Date: Nov. 8, 2018

(65) Prior Publication Data
US 2019/0357569 A1   Nov. 28, 2019

(30) Foreign Application Priority Data
May 2, 2017   (CN) .......................... 2017 1 0300022

(51) Int. Cl.
| | |
|---|---|
| A23J 1/08 | (2006.01) |
| A23J 3/04 | (2006.01) |
| A23L 5/20 | (2016.01) |
| A23J 3/34 | (2006.01) |

(52) U.S. Cl.
CPC . A23J 1/08 (2013.01); A23J 3/04 (2013.01); A23J 3/341 (2013.01); A23L 5/21 (2016.08); A23L 5/25 (2016.08)

(58) Field of Classification Search
CPC ...... A23J 1/08; A23J 3/04; A23J 3/341; A23L 5/21; A23L 5/25
USPC ......................................................... 426/56
See application file for complete search history.

(56) References Cited

U.S. PATENT DOCUMENTS

2013/0260437 A1* 10/2013 Ma .......................... C07K 1/303
                                                            435/206

FOREIGN PATENT DOCUMENTS

| CN | 105801689 A | 7/2016 |
|---|---|---|
| CN | 106075385 A | 11/2016 |
| CN | 107047925 A | 8/2017 |
| JP | 02135097 A | 5/1990 |
| WO | 2006125847 A1 | 11/2006 |

OTHER PUBLICATIONS

Matsumoto, K. et al. J. Fac. Agr., Kyushu Univ. 41:239-245 (1997) (Year: 1997).*
Watanabe, T. et al. Biosci. Biotech. Biochem., 58:359-362 (1994) (Year: 1994).*
Harvey, D. J. et al. J. Am. Soc. Mass Spectrom. 11:564-571 (Abstract) (Year: 2000).*
Wang et al. Sci. Technol. Food Ind. 19: 2012—English Abstract (Year: 12).*
Bi Jing-Hui et. al, Effect of enzymatic proteolysis by different enzyme on the antigenicity of ovalbumin in egg white, Science and Technology of Food Industry, 2012, 72-75.
Micheal L. Sinnott, Catalytic Mechanisms 0f Enzymic Glycosyl Transfer, Chemical Reviews, Dec. 30, 1990, 7(90), 1171-1202.
Zhang Wei et. al, Enzymatic hydrolysis of trypsin effects on milk protein antigenicity, China Dairy Industry, 2014, 6 (42), 7-11.
Rodrigo Jimenez-Saiz et. al, Human Immunoglobulin E (IgE) Binding to Heated and Glycated Ovalbumin and Ovomucoid before and after in Vitro Digestion, Journal of Agricultural and Food Chemistry, 2011.

* cited by examiner

*Primary Examiner* — Hamid R Badr
(74) *Attorney, Agent, or Firm* — Bayramoglu Law Offices LLC

(57) ABSTRACT

The present invention discloses a method for efficiently and mildly reducing ovalbumin allergenicity. The present invention promotes the exposure of the ovalbumin allergenic site to the molecular surface by repeated freezing and thawing pretreatment, and combines transglycosylase and trypsinase for synergistic treatment to reduce the ovalbumin sugar chain and epitope to achieve the purpose of significantly reducing the allergenicity of ovalbumin and egg foods. Compared with other traditional methods such as high temperature and high pressure and other physical means to reduce egg allergenicity, the method significantly improves the specificity and effectiveness of egg desensitization, and minimizes the damage to the nutrition and quality of egg proteins, and is an efficient and mild egg desensitization method. The method has the prospects of being applied to the industrial development of low-allergenicity egg products.

13 Claims, 2 Drawing Sheets

METHOD FOR EFFICIENTLY AND MILDLY REDUCING OVALBUMIN ALLERGENICITY

CROSS REFERENCE TO RELATED APPLICATIONS

This application is the national phase entry of International Application No. PCT/CN2018/073968, filed on Jan. 24, 2018, which is based upon and claims priority to Chinese Patent Application No. 201710300022.3, filed on May 2, 2017, the entire contents of which are incorporated herein by reference.

TECHNICAL FIELD

The present invention belongs to the technical field of food additives, and relates to a method for efficiently and mildly reducing ovalbumin allergenicity.

BACKGROUND

Eggs are widely used in daily diet and food processing due to their rich nutrition and low cost. However, as one of the major food allergens, its allergenicity forces 2% of children and infants worldwide to have difficulty in accessing this high-quality protein source at critical stages of physical development; especially in Asian countries such as China and Japan, more than half food allergies are caused by eggs. At present, there is no particularly effective treatment for egg allergy, and strict avoidance of egg intake is the most effective way to prevent egg allergy. However, with the development of the modern food industry, allergic people can hardly avoid contact with egg-containing foods. Therefore, exploring effective desensitization methods is of great significance for improving the safety of eggs and egg products.

Food allergy is mainly divided into two categories: IgE-mediated and non-IgE-mediated. Egg allergy is an IgE-mediated immediate allergic reaction. The main allergens include four albumins, namely ovalbumin, ovomucoid, ovotransferrin and lysozyme. The epitope of the allergenic protein molecule (several to tens of amino acid residues) is the material basis for the allergen to bind to the antibody and trigger an allergic reaction, and thus is the key to revealing the nature of the allergic reaction. According to the structural difference, epitopes can be divided into linear epitopes (continuous amino acid residues) and conformational epitopes (non-continuous amino acid residues).

Ovalbumin is a phosphoglycoglobulin containing 3% glycosyl component, accounting for about 54% of albumins and having a molecular weight of 44.5 kDa; and its molecule contains 4 thiol groups and 1 disulfide bond. Ovalbumin contains 5 IgE binding epitopes which prove to be linear epitopes (L38T49, D95A102, E191V200, V243E248, G251N260), 4 of them are exposed to the surface of the molecule, and the secondary structure contains β-sheet and β-turn. At present, enzymatic hydrolysis of allergenic proteins is one of the effective means of food desensitization. However, ovalbumin exhibits high resistance to common proteases due to the special structure such as hydrophobic core, disulfide bond and glycosylation in the molecule. In recent years, scholars have begun to try to adopt the physical means on the basis of the enzymatic method for synergistic treatment of allergenic proteins, and achieve a favorable desensitization effect. For example, Jimenez-Saiz (2011) et al. studied the hydrolysis of ovalbumin in a simulated digestion model after heat treatment, which proved that heat treatment can enhance the sensitivity of allergenic proteins to digestive enzymes and reduce the binding capacity of hydrolysate IgE; and Bi Jinghui explored the effects of different treatments on the allergenicity of whole egg white, and the results showed that the high pressure boiling and papain synergistic treatment can greatly reduce the antigenicity of ovalbumin. These studies provide a reference for the development of low-allergenicity egg products. However, these methods are likely to cause deterioration in the quality of egg products due to physical conditions such as high temperature and high pressure being too severe. Therefore, exploring an efficient and mild desensitization method can fundamentally improve the effectiveness of egg desensitization.

Previous studies have shown that repeated freezing and thawing can promote partial denaturation of proteins, exposing the hydrophobic groups originally contained in the inner core to the surface of the molecules, and causing changes in protein disulfide bonds. These hydrophobic groups and disulfide bonds are directly related to the epitope and antigenicity of ovalbumin. Then, whether repeated freezing and thawing can promote the exposure of epitopes and increase their sensitivity to proteases to improve the efficiency of enzymatic desensitization is worthy of further study. At the same time, different from physical methods such as high temperature and high pressure, repeated freezing and thawing can maintain or improve the processing characteristics of proteins (foamability, emulsibility, gelling property, etc.) to the greatest extent; and previous findings have shown that the use of repeated freezing and thawing treatment of soybeans proteins can improve their processing characteristics, and is economical, simple and feasible in industry. These findings provide a theoretical reference for the application of repeated freezing and thawing as a pretreatment method for the development of low-allergenicity egg products.

SUMMARY

Technical Problem

In view of the above technical problems, an objective of the present invention is to disclose a method for efficiently and mildly reducing ovalbumin allergenicity.

Technical Solution

The objective of the present invention is achieved by the following solution:

a method for efficiently and mildly reducing ovalbumin allergenicity comprises the following steps:

(1) ovalbumin extraction separating egg white from yolk with an egg separator, adding 1-8 times by volume of 50 mmol/L NaCl solution to the egg white, mixing and stirring for 1-6 h, and adjusting the pH to 6.0; adding 10 wt % to 60 wt % of PEG-8000 as a surfactant, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin;

(2) repeated freezing and thawing treatment redissolving the ovalbumin obtained in step (1) in deionized water at a ratio of 5.4% in the natural egg white, freezing at −20° C. for 12 h, thawing at 20° C. for 12 h, repeating 3-7 times, and finally, freeze-drying to obtain a protein sample;

(3) enzyme treatment adding glycosyltransferase into the ovalbumin treated in step (2) according to an enzyme:protein mass ratio of 1:(100-300), treating under the conditions of pH 8.0 and 25° C. for 2 h, adding trypsinase according to an enzyme:protein mass ratio of 1:(100-300), adjusting the pH to 8.0, treating at 25° C. for 2 h to obtain a final ovalbumin hydrolysis sample, and freeze-drying to obtain a final product.

Preferably, 3 times by volume of 50 mmol/L NaCl solution is added into the egg white in step (1) of the method, and mixing and stirring are carried out for 2 h.

Preferably, in step (1) of the method, 15 wt % of PEG-8000 is added as a surfactant.

Preferably, the number of times of repeated freezing and thawing treatment in step (2) of the method is 5.

Preferably, the transglycosylase:protein ratio in step (3) of the method is 1:200.

Preferably, the trypsinase:protein ratio in step (3) of the method is 1:200.

Ovalbumin is prepared by any one of the above-mentioned methods for efficiently and mildly reducing ovalbumin allergenicity.

Advantageous Effect

The present invention has the following advantageous effects: compared with traditional strong physical means (high temperature, high pressure, ultrasonic wave, etc.) combined with enzyme treatment, the present invention promotes the exposure of the ovalbumin allergenic site to the molecular surface by repeated freezing and thawing pre-treatment, and combines transglycosylase and trypsinase for synergistic treatment to reduce the ovalbumin sugar chain and epitope to achieve the purpose of significantly reducing the allergenicity of ovalbumin and egg foods. Compared with other traditional methods such as high temperature and high pressure and other physical means to reduce egg allergenicity, the method significantly improves the specificity and effectiveness of egg desensitization, and minimizes the damage to the nutrition and quality of egg proteins, and is an efficient and mild egg desensitization method. The method has the prospects of being applied to the industrial development of low-allergenicity egg products.

DETAILED DESCRIPTION OF THE EMBODIMENTS

Figure 1:
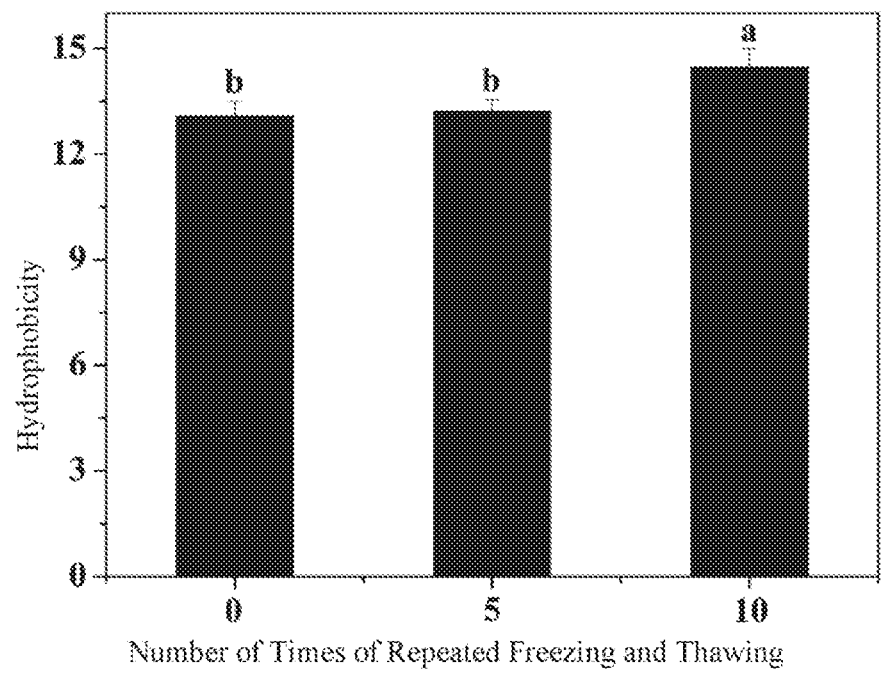
FIG. 1 shows the trend of hydrophobicity of ovalbumin after repeated freezing and thawing for 0, 5, and 10 times.
Figure 2:
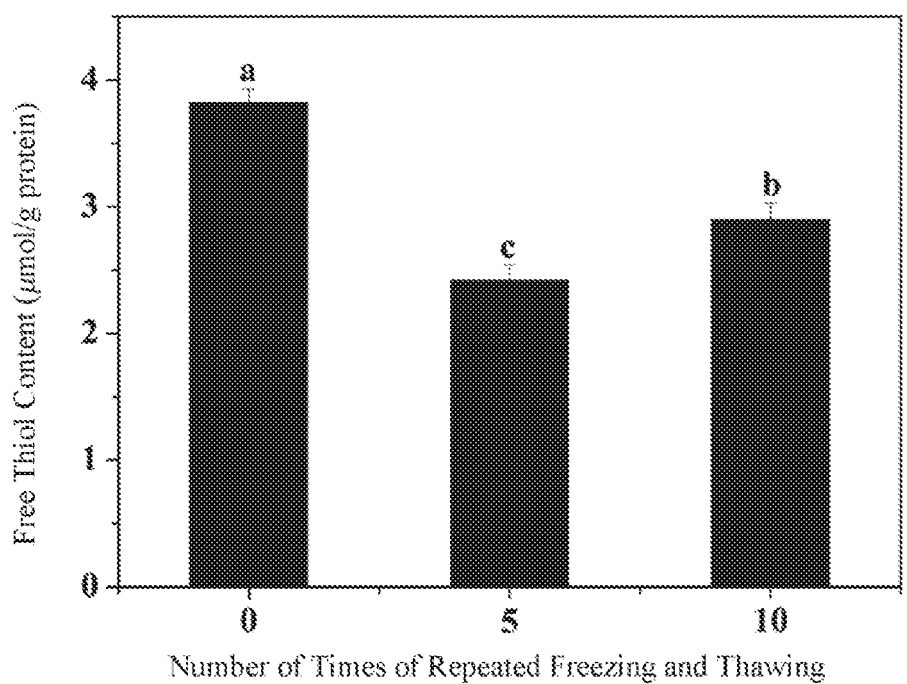
FIG. 2 shows the trend of free thiol content of ovalbumin after repeated freezing and thawing for 0, 5, and 10 times.
Figure 3:
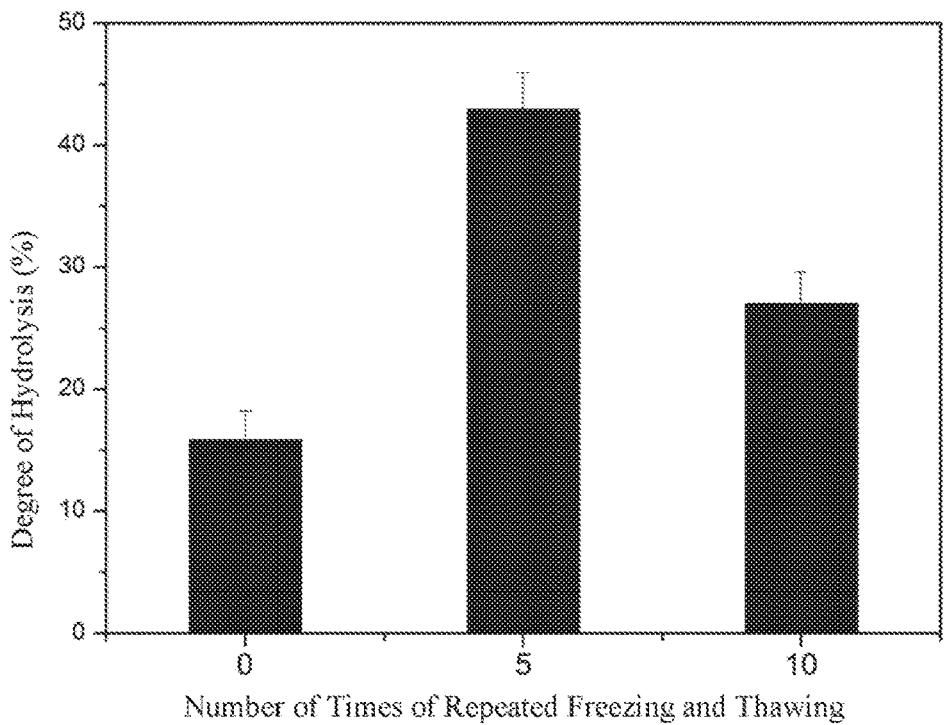
FIG. 3 shows the trend of the degree of double-enzyme hydrolysis of ovalbumin after repeated freezing and thawing for 0, 5, and 10 times.
Figure 4:
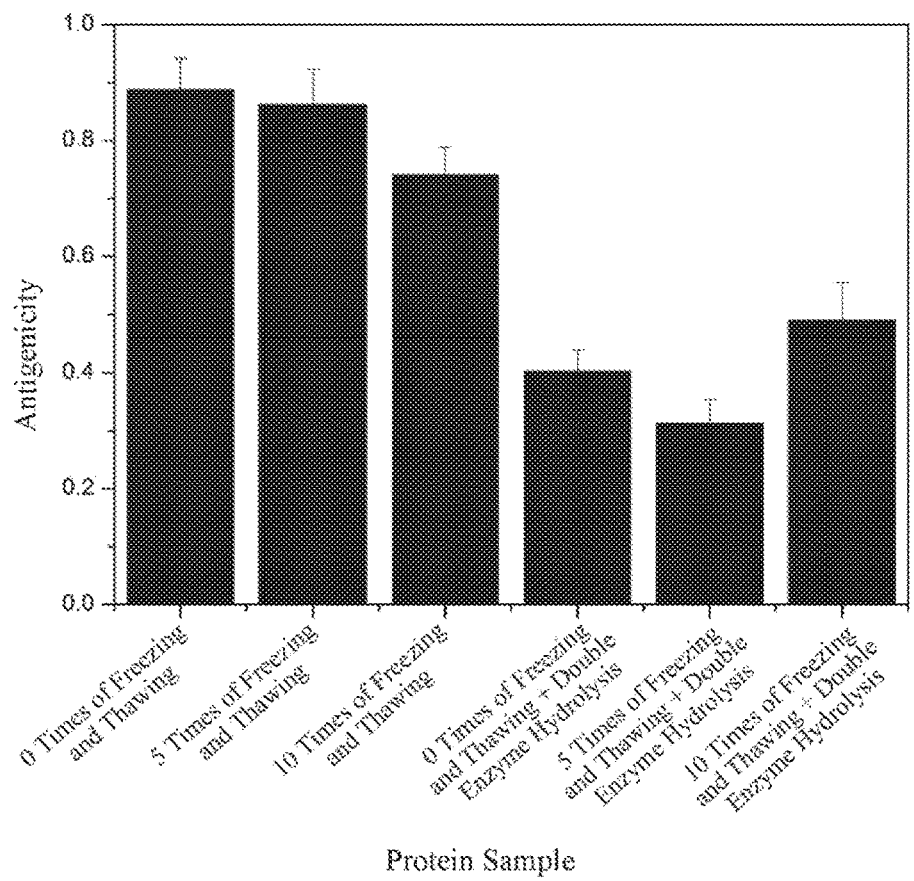
FIG. 4 shows the trend of ovalbumin allergenicity before and after repeated freezing and thawing for 0, 5, and 10 times and double enzyme hydrolysis.

The present invention will be further described in conjunction with specific embodiments.

1. Determination of Hydrophobicity

Protein samples were diluted with phosphate buffer to different concentrations of 0.005%, 0.01%, 0.05%, 0.1%, 0.2% respectively. A 20 μm fluorescent probe solution of sodium 8-anilino-1-naphthalenesulfonate (ANS) was added to 4 mL of the protein sample. The fluorescence intensity of the sample was determined by a fluorescence spectrophotometer with an excitation wavelength of 390 nm and an emission wavelength of 470 nm. The initial slope between fluorescence intensity and protein concentration was the surface hydrophobicity ($H_0$) of the protein.

2. Determination of Free Thiol Content 40 mg of protein sample was dissolved in 4 mL of SDS-TGE buffer, and dissolved for 30 min with a vortex oscillation every 10 min. 0.04 mL of Ellman's reagent was added thereto and reacted for 30 min. After centrifugation (10000×g, 20 min), the supernatant was taken, and the absorbance value was determined with a spectrophotometer at a wavelength of 412 nm; the SDS-TGE solution was used as a blank control. Calculation of results: A standard curve was prepared by using reduced glutathione as a standard, and the final result was expressed as mmol thiol/g protein.

3. Determination of Degree of Hydrolysis

The degree of hydrolysis (DH) of protein samples with different number of times of freezing and thawing was determined by pH titration. DH was calculated according to the following equation (trypsinase/transglycosylase:protein=1:200):

$$DH(\%) = [(V_{NaOH} \times N_{NaOH})/(\alpha \times MP \times h_{tot})] \times 100$$

wherein, α is the degree of dissociation of the α-amino group, MP is the mass (g) of PSV, and $h_{tot}$ is the number of peptide bonds in the substrate (milliequivalent/g protein). The NaOH concentration is 0.25M. The α value is 0.88 at 25° C. and pH 8.0, and the $h_{tot}$ value of egg proteins is 8.38.

Reaction conditions: 25° C.; deionized water system; pH 8.0.

4. Determination of Allergenicity

All the above samples (0 times of freezing and thawing, 5 times of freezing and thawing, 10 times of freezing and thawing, 0 times of freezing and thawing+ double enzyme hydrolysis, 5 times of freezing and thawing+ double enzyme hydrolysis, and 10 times of freezing and thawing+ double enzyme hydrolysis) were assayed for antigenicity of the proteins according to the instructions for use of the albumin detection kit (German R-Biopharm, R6402).

Embodiment 1

(1) Ovalbumin extraction: separating egg white from yolk with an egg separator, adding 1 time by volume of 50 mmol/L NaCl solution to the egg white, mixing and stirring for 2 h, and adjusting the pH to 6.0; adding 10% (w/w) of PEG-8000 as a surfactant, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) Repeated freezing and thawing treatment: redissolving the ovalbumin obtained in step (1) in deionized water at a ratio of 5.4% in the natural egg white, freezing at −20° C. for 12 h, thawing at 20° C. for 12 h, respectively repeating 3 times, and finally, freeze-drying to obtain a protein sample.

(3) Enzyme treatment: adding glycosyltransferase into the ovalbumin treated in step (2) according a ratio of 1:200 (wt/wt, enzyme:protein), treating under the conditions of pH 8.0 and 25° C. for 2 h, adding trypsinase according to a ratio of 1:200 (wt/wt, enzyme:protein), adjusting the pH to 8.0, treating at 25° C. for 2 h to obtain a final ovalbumin hydrolysis sample, and freeze-drying to obtain a final product.

Embodiment 2

(1) Ovalbumin extraction: separating egg white from yolk with an egg separator, adding 8 times by volume of 50 mmol/L NaCl solution to the egg white, mixing and stirring for 2 h, and adjusting the pH to 6.0; adding 50% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) Repeated freezing and thawing treatment: redissolving the ovalbumin obtained in step (1) in deionized water at a ratio of 5.4% in the natural egg white, freezing at −20° C. for 12 h, thawing at 20° C. for 12 h, respectively repeating 7 times, and finally, freeze-drying to obtain a protein sample.

(3) Enzyme treatment: adding glycosyltransferase into the ovalbumin treated in step (2) according a ratio of 1:200 (wt/wt, enzyme:protein), treating under the conditions of pH 8.0 and 25° C. for 2 h, adding trypsinase according to a ratio of 1:200 (wt/wt, enzyme:protein), adjusting the pH to 8.0, treating at 25° C. for 2 h to obtain a final ovalbumin hydrolysis sample, and freeze-drying to obtain a final product.

Embodiment 3

(1) Ovalbumin extraction: separating egg white from yolk with an egg separator, adding 3 times by volume of 50 mmol/L NaCl solution to the egg white, mixing and stirring for 2 h, and adjusting the pH to 6.0; adding 15% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) Repeated freezing and thawing treatment: redissolving the ovalbumin obtained in step (1) in deionized water at a ratio of 5.4% in the natural egg white, freezing at −20° C. for 12 h, thawing at 20° C. for 12 h, respectively repeating 5 times, and finally, freeze-drying to obtain a protein sample.

(3) Enzyme treatment: adding glycosyltransferase into the ovalbumin treated in step (2) according a ratio of 1:200 (wt/wt, enzyme:protein), treating under the conditions of pH 8.0 and 25° C. for 2 h, adding trypsinase according to a ratio of 1:200 (wt/wt, enzyme:protein), adjusting the pH to 8.0, treating at 25° C. for 2 h to obtain a final ovalbumin hydrolysis sample, and freeze-drying to obtain a final product.

Comparative Embodiment 1

(1) Ovalbumin extraction: separating egg white from yolk with an egg separator, adding 1 time by volume of 50 mmol/L NaCl solution to the egg white, mixing and stirring for 2 h, and adjusting the pH to 6.0; adding 10% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) Heating pretreatment: redissolving the ovalbumin obtained in step (1) in deionized water according to a ratio of 10 mg/mL, treating in a 80° C. water bath for 20 min, naturally cooling to room temperature, and freeze-drying to obtain a protein sample.

(3) Enzyme treatment: adding trypsinase into the ovalbumin treated in step (2) according a ratio of 1:200 (wt/wt, enzyme:protein), adjusting the pH to 8.0, treating at 50° C. for 2 h to obtain a final ovalbumin hydrolysis sample, and freeze-drying to obtain a final product.

Comparative Embodiment 2

(1) Ovalbumin extraction: separating egg white from yolk with an egg separator, adding 1 time by volume of 50 mmol/L NaCl solution to the egg white, mixing and stirring for 2 h, and adjusting the pH to 6.0; adding 10% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) Ultrasonic pretreatment: redissolving the ovalbumin obtained in step (1) in deionized water according to a ratio of 10 mg/mL, performing ultrasonic treatment for 20 min (work 5 s, pause 5 s, power 1000 W), and freeze-drying to obtain a protein sample.

(3) Enzyme treatment: adding trypsinase into the ovalbumin treated in step (2) according a ratio of 1:200 (wt/wt, enzyme:protein), adjusting the pH to 8.0, treating at 50° C. for 2 h to obtain a final ovalbumin hydrolysis sample, and freeze-drying to obtain a final product.

Comparative Embodiment 3

(1) Ovalbumin extraction: separating egg white from yolk with an egg separator, adding 1 time by volume of 50 mmol/L NaCl solution to the egg white, mixing and stirring for 2 h, and adjusting the pH to 6.0; adding 10% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) High-temperature high-pressure pretreatment: redissolving the ovalbumin obtained in step (1) in deionized water according to a ratio of 10 mg/mL, putting in an autoclave, treating at 121° C. for 20 min, and freeze-drying to obtain a protein sample.

(3) Enzyme treatment: adding trypsinase into the ovalbumin treated in step (2) according a ratio of 1:200 (wt/wt, enzyme:protein), adjusting the pH to 8.0, treating at 50° C. for 2 h to obtain a final ovalbumin hydrolysis sample, and freeze-drying to obtain a final product.

Comparative Embodiment 4

(1) Ovalbumin extraction: separating egg white from yolk with an egg separator, adding 1 time by volume of 50 mmol/L NaCl solution to the egg white, mixing and stirring for 2 h, and adjusting the pH to 6.0; adding 10% (w/w) of PEG-8000, and magnetically stirring for 2 h; centrifuging at 4° C. and 15000 g for 10 min, and collecting the supernatant; dialyzing the collected liquid 4 times with deionized water at 4° C., and freeze-drying to obtain ovalbumin.

(2) High-temperature high-pressure pretreatment: redissolving the ovalbumin obtained in step (1) in deionized water according to a ratio of 10 mg/mL, putting in an autoclave, treating at 121° C. for 20 min, and freeze-drying to obtain a protein sample.

(3) Enzyme treatment: adding papain into the ovalbumin treated in step (2) according a ratio of 1:200 (wt/wt, enzyme:protein), treating under the conditions of pH 7.0 and 25° C. for 2 h, adding trypsinase according to a ratio of 1:200 (wt/wt, enzyme:protein), adjusting the pH to 8.0, treating at 50° C. for 2 h to obtain a final ovalbumin hydrolysis sample, and freeze-drying to obtain a final product.

The embodiment comparison was made by using common physical pretreatment means (heating, ultrasonic, high-temperature high-pressure) and common proteinase (trypsinase, papain). The results showed that the degree of hydrolysis of OVA in comparative embodiments 1, 2, 3 and 4 was respectively 17.4%, 20.2%, 27.5% and 31.1%; and the antigenicity was respectively 0.64, 0.72, 0.56 and 0.47. It can be seen that, compared with the treatment method of the present invention, physical pretreatment such as heating and ultrasonic plus single enzyme (trypsinase) hydrolysis treatment has a poor effect, but the synergistic treatment of high temperature and high pressure and a composite enzyme process (trypsinase, papain) has a favorable desensitization effect, which is equivalent to that of the method of the present invention. However, the treatment conditions such as high temperature and high pressure are too severe, and the quality of the final egg product is likely to be lowered. This is also an innovation of the mild and efficient egg desensitization method of the present invention.

What is claimed is:

1. A method for reducing ovalbumin allergenicity, wherein the method comprises the following steps:

(1) ovalbumin extraction separating egg white from yolk with an egg separator, adding 50 mmol/L NaCl solution to the egg white to obtain a first liquid, wherein an amount of 50 mmol/L NaCl solution is 1-8 times the egg white by volume, mixing and stirring the first liquid for 1-6 hours, and adjusting pH of the first liquid to 6.0; adding 10 wt % to 60 wt % of PEG-8000 as a surfactant to the first liquid to obtain a second liquid, and magnetically stirring the second liquid for 2 hours; centrifuging the second liquid at 4° C. and 15000 g for 10 minutes, and collecting a supernatant of the second liquid; dialyzing the supernatant 4 times with deionized water at 4° C. to obtain dialyzed liquid, and freeze-drying the dialyzed liquid to obtain ovalbumin;

(2) repeated freezing and thawing treatment redissolving the ovalbumin obtained in step (1) in deionized water to obtain a third liquid, freezing the third liquid at −20° C. for 12 hours, thawing the third liquid at 20° C. for 12 hours, repeating 3-7 times, and finally, freeze-drying the third liquid to obtain a protein sample;

(3) enzyme treatment adding glycosyltransferase into the protein sample treated in step (2) according to an enzyme to protein mass ratio of 1:100-300 to obtain a fourth liquid, treating the fourth liquid under conditions of pH 8.0 and 25° C. for 2 hours, adding trypsinase according to an enzyme to protein mass ratio of 1:100-300 to the fourth liquid to obtain a fifth liquid, adjusting pH of the fifth liquid to 8.0, treating the fifth liquid at 25° C. for 2 hours to obtain a final ovalbumin hydrolysis sample, and freeze-drying the final ovalbumin hydrolysis sample to obtain a final product.

2. The method for reducing ovalbumin allergenicity according to claim 1, wherein the amount of 50 mmol/L NaCl solution is three times the egg white by volume in step (1) of the method to obtain a sixth liquid, and mixing and stirring are carried out on the sixth liquid for 2 hours.

3. The method for reducing ovalbumin allergenicity according to claim 1, wherein in step (1) of the method, 15 wt % of PEG-8000 is added as a surfactant.

4. The method for reducing ovalbumin allergenicity according to claim 1, wherein the number of times the repeated freezing and thawing treatment of step (2) is repeated is five times.

5. The method for reducing ovalbumin allergenicity according to claim 1, wherein the glycosyltransferase to protein ratio in step (3) of the method is 1:200.

6. The method for reducing ovalbumin allergenicity according to claim 1, wherein the trypsinase to protein ratio in step (3) of the method is 1:200.

7. Ovalbumin prepared by the method for reducing ovalbumin allergenicity according to claim 1.

8. The ovalbumin according to claim 7, wherein the amount of 50 mmol/L NaCl solution is three times the egg white by volume in step (1) of the method to obtain a sixth liquid, and mixing and stirring are carried out on the sixth liquid for 2 hours.

9. The ovalbumin according to claim 7, wherein in step (1) of the method, 15 wt % of PEG-8000 is added as a surfactant.

10. The ovalbumin according to claim 7, wherein the number of times the repeated freezing and thawing treatment of step (2) is repeated is five times.

11. The ovalbumin according to claim 7, wherein the glycosyltransferase to protein ratio in step (3) of the method is 1:200.

12. The ovalbumin according to claim 7, wherein the trypsinase to protein ratio in step (3) of the method is 1:200.

13. A method for reducing ovalbumin allergenicity, wherein the method comprises the following steps:

(1) ovalbumin extraction separating egg white from yolk with an egg separator, adding 50 mmol/L NaCl solution to the egg white to obtain a first liquid, wherein an amount of 50 mmol/L NaCl solution is 3 times the egg white by volume, mixing and stirring the first liquid for 2 hours, and adjusting pH of the first liquid to 6.0; adding 15 wt % of PEG-8000 as a surfactant to the first liquid to obtain a second liquid, and magnetically stirring the second liquid for 2 hours; centrifuging the second liquid at 4° C. and 15000 g for 10 minutes, and collecting a supernatant of the second liquid; dialyzing the supernatant 4 times with deionized water at 4° C. to obtain dialyzed liquid, and freeze-drying the dialyzed liquid to obtain ovalbumin;

(2) repeated freezing and thawing treatment redissolving the ovalbumin obtained in step (1) in deionized water to obtain a third liquid, freezing the third liquid at −20° C. for 12 hours, thawing the third liquid at 20° C. for 12 hours, repeating 5 times, and finally, freeze-drying the third liquid to obtain a protein sample;

(3) enzyme treatment adding glycosyltransferase into the protein sample treated in step (2) according to an enzyme to protein mass ratio of 1:200 to obtain a fourth liquid, treating the fourth liquid under conditions of pH 8.0 and 25° C. for 2 hours, adding trypsinase according to an enzyme to protein mass ratio of 1:200 to the fourth liquid to obtain a fifth liquid, adjusting pH of the fifth liquid to 8.0, mixing and stirring the fifth liquid and treating the fifth liquid at 25° C. for 2 hours to obtain a final ovalbumin hydrolysis sample, and freeze-drying the final ovalbumin hydrolysis sample to obtain a final product.

* * * * *